(12) United States Patent
Reimers

(10) Patent No.: US 7,396,879 B2
(45) Date of Patent: Jul. 8, 2008

(54) METHOD FOR REDUCING RESIDUAL MONOMER IN A POLYMER MATRIX

(75) Inventor: Jay Reimers, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 369 days.

(21) Appl. No.: 11/062,369

(22) Filed: Feb. 22, 2005

(65) Prior Publication Data

US 2006/0189757 A1    Aug. 24, 2006

(51) Int. Cl.
*C08F 6/06* (2006.01)
*C08F 6/10* (2006.01)
*C08F 6/14* (2006.01)
*C08F 6/24* (2006.01)
*C08F 6/26* (2006.01)

(52) U.S. Cl. .................. 525/192; 525/193; 525/194; 525/195; 525/196

(58) Field of Classification Search ................ 525/192, 525/193, 194, 195, 196
See application file for complete search history.

(56) References Cited

U.S. PATENT DOCUMENTS

| 3,257,341 A | * | 6/1966 | Wilfrid et al. | ................ 524/392 |
| 5,886,140 A | * | 3/1999 | Olivares et al. | ............. 528/485 |
| 2004/0068093 A1 | * | 4/2004 | Merrigan et al. | ............ 528/490 |

* cited by examiner

*Primary Examiner*—Nathan M Nutter
(74) *Attorney, Agent, or Firm*—Shirley A. Kopecky; Gene Tyler

(57) ABSTRACT

Residual monomer in a polymer matrix may be reduced by a method including admixing a polymer matrix comprising an amount of residual monomer and a conjugated diene. This method can be carried out under reaction conditions such that the amount of residual monomer is reduced. The monomer comprises at least one electron withdrawing substituent and the conjugated diene comprises at least one electron donating substituent. This method is particularly useful for reducing the amount of residual styrene monomer in polystyrene homopolymer and copolymer compositions.

29 Claims, No Drawings

METHOD FOR REDUCING RESIDUAL MONOMER IN A POLYMER MATRIX

BACKGROUND OF THE INVENTION

1. Technical Field

This invention relates to polymers and more particularly to methods of reducing residual monomers present in polymer matrices.

2. Background of the Art

In the polymerization of a variety of thermoplastic materials it is generally difficult to obtain 100 percent monomer conversion. This means that there is usually some proportion, generally a few percent at most, of unreacted monomer remaining in the final polymer. This unreacted, or residual, monomer may cause problems during subsequent monomer processing or when the monomer is used to prepare an end use article. Such problems include migration or volatilization of the residual monomer, which may result in sticky pellets, poor surface quality in the end use article, problems with environmental standards, and the like.

One such polymer is polystyrene, which enjoys a wide variety of uses in articles formed via extrusion, milling, molding, drawing, blowing, and the like. In manufacturing polystyrene compositions, it is well known that free, unconverted styrene monomer remains absorbed within the polymer particles where polymerization is not 100 percent complete. Recently government regulatory agencies have moved toward establishing maximum permissible levels of various monomers in the environment on grounds that excessive levels may constitute a health hazard. These regulations may apply particularly to packaging materials intended for contact with environmentally sensitive products such as food, beverages, pharmaceuticals, cosmetics and the like, for which applications styrenic copolymers are especially suited.

Accordingly, it would be desirable in the art to identify a method of reducing the presence of residual styrene that can be used either before or during compounding.

SUMMARY OF THE INVENTION

In one embodiment, the invention is a method for reducing residual monomer in a polymer matrix including admixing a polymer matrix having an amount of residual monomer and a conjugated diene under reaction conditions such that the amount of residual monomer is reduced, wherein the monomer includes at least one electron withdrawing substituent and the conjugated diene includes at least one strong or moderate electron donating substituent or at least two weak electron donating substituents.

In another embodiment, the invention is a polymer matrix including an adduct of a conjugated diene and a residual monomer, wherein the monomer includes at least one electron withdrawing substituent and the conjugated diene includes at least one strong or moderate electron donating substituent or at least two weak electron donating substituents.

In still another embodiment, the invention is an article of manufacture including a polymer matrix including an adduct of a conjugated diene and a residual monomer, wherein the monomer includes at least one electron withdrawing substituent and the conjugated diene includes at least one strong or moderate electron donating substituent or at least two weak electron donating substituents.

DETAILED DESCRIPTION OF THE INVENTION

The invention provides a group of materials that, when added to or otherwise in contact with a polymer matrix containing an amount of residual monomer, are effective to reduce the level of such by forming adducts therewith. These adducts are desirably present at levels that do not undesirably interfere with the properties of the polymer matrix as it undergoes further processing and is eventually used in or as a polymer composition to form an end use article. As used herein, the term "polymer matrix" refers to the combination of the polymer, which may be a homopolymer or copolymer, or any combination thereof, and any unreacted, i.e., residual, monomer remaining after the polymerization that forms such polymer.

The method includes a monomer that may be generally characterized as including a substituent characterized as "electron withdrawing". Such may be selected from, for example, the group consisting of aromatic groups, —CN, —COOH, —COOR$^6$, —COR$^6$, —F, —Cl, —Br, and combinations thereof, wherein R$^6$ is selected from the group consisting of alkyl and phenyl groups. Other substituents may be employed in embodiments of the invention, provided such may be defined as electron withdrawing.

Examples of these residual monomers include, but are not limited to styrene, butadiene, isoprene, alpha methyl styrene, alkyl acrylates, alkyl methacrylates, and acrylonitrile.

The polymer matrix including the monomer may be selected from a wide variety of thermoplastic and thermoset materials. In one embodiment, the polymer is predominantly polystyrene homopolymer and the residual monomer is predominantly styrene. In other embodiments the polymer is a copolymer containing at least about 10 percent by weight of polymerized styrene together with one or more copolymerized comonomers. Such comonomers may include:

(a) monovinylidene aromatic hydrocarbon monomers other than styrene of the formula:

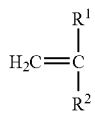

wherein R$^1$ is hydrogen, chlorine or methyl and R$^2$ is an aryl group of 6 to 10 carbon atoms and may also contain substituents such as halogen as well as alkyl groups attached to the aromatic nucleus, e.g., alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichlorostyrene, vinyl naphthalene, combinations thereof, and the like;

(b) lower alpha olefins of from 2 to 8 carbon atoms, e.g., ethylene, propylene, isobutylene, butene-1, pentene-1, and their halogen and aliphatic substituted derivatives, e.g., vinyl chloride, vinylidene chloride, and the like;

(c) acrylic acid and methacrylic acid and the corresponding acrylate and methacrylate alkyl esters where the alkyl group contains from 1 to 4 carbon atoms, e.g., methyl acrylate, ethylacrylate, propyl acrylate, methyl methacrylate, and the like;

(d) vinyl esters of the formula:

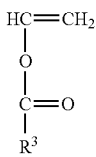

wherein $R^3$ is hydrogen, an alkyl group of from 1 to 10 carbon atoms, an aryl group of 6 to 10 carbon atoms, e.g., vinyl formate, vinyl acetate, vinyl propionate, vinyl benzoate, and the like:
(e) vinyl ether monomers of the formula:

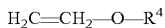
$$H_2C{=}CH_2{-}O{-}R^4$$

wherein $R^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbon- or oxygen-containing, i.e., an aliphatic radical with ether linkages and may also contain other substituents such as halogen, carbonyl, and the like. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, and the like; and
(f) olefinically unsaturated mononitriles having the formula:

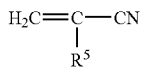

wherein $R^5$ is hydrogen, an alkyl group having 1 to 4 carbon atoms or a halogen. Such compounds include acrylonitrile, methacrylonitrile, ethacrylo-nitrile, propioacrylonitrile, alpha chloracrylonitrile, and the like.

Additional comonomers useful in the practice of the invention are those containing a mono- or di-nitrile function. Examples of these include methylene glutaronitrile, 2,4-dicyanobutene-1, vinylidene cyanide, crotonitrile, fumaronitrile, maleonitrile, and the like.

Preferred comonomers are the olefinically unsaturated mononitrile, monovinylidene aromatic hydrocarbons, lower alpha olefins, acrylic and methacrylic acid and the corresponding acrylate and methacrylate esters, with the olefinically unsaturated mononitrile hydrocarbons being more particularly preferred. Most specifically preferred is acrylonitrile and alpha methylstyrene.

The amount of comonomer as defined above present in the styrenic composition may vary up to about 90% by weight based on the total weight of the styrenic polymer composition. Preferred styrenic compositions for packaging applications requiring excellent oxygen and water vapor barrier properties in the packaging materials may contain from about 10 to about 50 percent by weight of polymerized styrene monomer and from about 90 to about 50 percent by weight of polymerized acrylonitrile comonomer and more preferably from about 15 to about 45 percent by weight of styrene monomer and from about 85 to about 55 percent by weight of acrylonitrile monomer, all based on total polymer weight.

Styrenic polymers within the scope of this invention may also contain an elastomer in the form of a synthetic or natural rubber component such as polybutadiene, isoprene, neoprene, nitrile rubbers, natural rubbers, acrylonitrilebutadiene copolymers, ethylene-propylene copolymers, chlorinated rubbers, etc., which are used to strengthen or toughen products such as shaped packaging materials. This rubber component may be incorporated in the styrene polymer by any of the methods well known to those skilled in the art, e.g., direct polymerization of the monomers, polyblends, grafting the styrene-acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25 percent and preferably up to about 10 percent by weight of the nitrile polymer composition.

In practicing the invention, any level of residual monomer in the polymer matrix may be present. In desirable embodiments, however, the level of residual monomer represents a minor proportion. In particularly desirable embodiments it is less than about 10 percent by weight of the polymer matrix, and in some embodiments is less than about 5 percent by weight. In other embodiments it is less than about 2 percent by weight. In one embodiment it is less than about 1 percent by weight.

Another term for the residual monomers described above is a dienophile, or in the plural, dienophiles. The active treating ingredient for reducing the residual monomer content is a conjugated diene having at least one strong to moderate electron donating substituent, or at least two weak electron donating substituents. In some embodiments, the strong or moderate electron donating substituent is selected from the group consisting of $-O^-$, $-COO^-$, $-NH_2$, $-NHCOCH_3$, $-SH$, alkoxy, $-CH{=}CH-$, and the like. The weak electron donating substituents is some embodiments are selected from the group consisting of alkanes, aromatic groups, substituted aromatic groups, alkenes wherein the alkenyl double bonds and not in conjugation with the dienyl double bonds, groups and the like.

In some embodiments, the conjugated diene has at least two substitutions, although a greater or lesser number of substitutions is also possible. Where the substituent is a weak electron donating group, there are at least two substituents. For the purposes of the this application, the subject electron donating substituent or substituents are located on or alpha to a carbon within the region of electron conjugation. For example, in a molecule having a 1, 3 conjugation, the subject substituents may be on carbons 1-5.

Specific materials useful as the conjugated diene in this invention include, for example, potassium sorbate, which is the potassium salt of 2,4-hexadienoic acid. Potassium sorbate is particularly useful for applications where the monomer being reduced is styrene. The monomer reduction reaction may be most effective when a diene reacts with a dienophile that is of different polarity. It is for this reason that in applications where the dienophile is non-polar such as is the case for styrene and vinyl toluene, a sorbate may be more effective than a non-polar diene.

It follows then that polar dienophiles, such as methylacrylic acid and maleic acid, may be more reactive with non-polar dienes such as butadiene or isoprene. It also follows that in situations where more than one monomer is being reduced and there are both polar and non-polar monomers present, it may be desirable to use both a polar and a non-polar diene. This could avoid problems of selectivity wherein only one of two monomers present is reduced.

Sorbic acid salt is a conjugated diene useful for reducing residual monomer levels. Other conjugated dienes that may be used with the invention include alloocimene (also called 2,6-dimethyl-2,4,6-octatriene); alpha-terpinene (also called 1-isopropyl-4-methyl-1,3-cyclohexadiene), 2,3-dimethyl-1, 3-butadiene-; amino-piperylene, diphenyl-1,3-butadiene; 1-cyano-1,3-butadiene; combinations thereof, and the like.

The amount of the selected conjugated diene for use in the invention is that which is sufficient to reduce the amount of residual monomer in the polymer matrix at the process point at which it is added. In desirable embodiments, the diene is sufficient to reduce the amount of residual monomer by at least about 50 percent by weight of the polymer matrix, and in other embodiments is sufficient to reduce the amount by at least about 75 percent by weight. In particular embodiments it may be desirable to reduce the amount of residual monomer to levels that are less than about 5 ppm, and in some embodiments less than about 1 ppm. Conversely, it is desirable that the conjugated diene be used in an amount which is not sufficient to result in detriment to the properties of the polymer matrix, either as to its processing or in its desired end use applications. It may be, in some embodiments, particularly desirable to avoid detriments such as, for example, deterioration of organoleptic properties for packaging applications.

In this regard the amount of the conjugated diene may, in some embodiments, be from about 0.005 to about 2.0 percent by weight, based on the weight of the polymer matrix. In most applications the amount of the conjugated diene will be in the range of from about 0.01 to about 1.5 percent by weight. Determination of the actual amount of residual monomer, which is useful to determine the effect of any given amount of the diene, may be accomplished using any method or means known to those in the art. Such may include, for example, calorimetric, polarographic, gas chromatographic, fluorometric or electrochemical measurements, with gas chromatographic measures being particularly convenient in some embodiments The selected conjugated diene and the selected polymer matrix are desirably combined in intimate admixture. Such may be accomplished at either of two general points in typical polymer formation processes. These points are during the devolatilization of the polymer, or during its compounding with other materials, including but not limited to additives to form an end use article. Devolatilization of a polymer is frequently a series of steps that follow the initial polymerization. These steps may include, for example, heating the polymer matrix under appropriate temperature and pressure to volatilize the residual monomers. For example, for polystyrene, temperatures around 220-250° C. can be used at pressures ranging from 2-40 Torr (266-5332 Pa). In other embodiments the conjugated diene may be alternatively or additionally admixed with the polymer matrix during compounding. At this point it may be dry blended with the polymer matrix prior to or after pellet formation, or just prior to or during melting to form a final end use article. In another embodiment the polymer matrix and the selected conjugated diene may be dispersed in a liquid medium followed by evaporation of the liquid medium. In still another embodiment the conjugated diene may be injected into the molten polymer during the melting operation. Other methods of forming the intimate mixture will be apparent to those skilled in the art.

The residual monomer in a polymer matrix may be mobile and escape from the polymer matrix. After reduction of residual monomer level, the adduct resulting from the interaction of the conjugated diene and the residual monomer may be non-migratory and non-volatile, and thus may reduce or prevent occurrence of undesirable migration or volatilization. In embodiments where the starting level of residual monomer is relatively low, particularly where it is less than about 10 percent, more particularly where it is less than about 5 percent, and still more particularly where it is less than about 2 percent, by weight of the polymer matrix, the presence of the adduct desirably may not interfere, at least to an undesirable point, with the physical and/or chemical properties of the polymer matrix and/or of any end use articles prepared therefrom.

The forming operations used to prepare products within the scope of the invention may be carried out by shaping the polymer by procedures known in the art. In this connection, conventional plasticators may be used while employing a screw rotating within a plasticizing zone to masticate the polymer. The screw may be either axially fixed or reciprocal, the latter being frequently employed in, for example, injection molding systems. The forming operations generally include a melting step, wherein the polymer is converted from solid to melt form by physical working at temperatures in the range of from about 177° C. to about 262° C. Any subsequent shaping steps are generally carried out on the melt. The melting and shaping steps may occur sequentially or substantially simultaneously. Examples of forming operations used to prepare shaped polymeric packaging materials include palletizing, extrusion, blow molding, injection molding, compression molding, mill rolling, vacuum forming, plug assist thermoforming from sheet material, combinations of the foregoing, and the like. Final products may include, for example, sheets, tubs, trays, containers such as bottles, cans, jars, etc., pre-forms for forming such, and the like. Procedures to prepare these materials are well known to those skilled in the art.

More than one forming operation wherein the polymer is heated and shaped may be involved in certain embodiments. This may occur, for example, in the case of a polymer which is heated through working to a melted state, extruded and pelletized, and then the pellets are heated again for melting and shaping into sheet or a tubular parison which is then shaped into a container such as a shallow tub or a bottle. In such situations, the invention contemplates having the conjugated diene in contact with the polymer matrix during at last one of the forming operations wherein the polymer is heated to the point where it melts and is then shaped. In one desirable embodiment, when more than one heating step is involved, the conjugated diene is intimately admixed with the polymer before or during the first step wherein the polymer is heated to melting.

The scope of the invention also includes the use of other additives and ingredients in the polymer compositions which do not adversely affect the properties of the resulting molded products. Such properties include, for example, organoleptic properties where the products are packaging materials intended for food contact use. Examples of these ingredients include thermal stabilizers, light stabilizers, dyes, pigments, plasticizers, fillers, antioxidants, lubricants, extrusion aids, scavengers for other monomers, combinations thereof and the like.

Also included within the scope of the invention are a polymer matrix including an adduct of the residual monomers and conjugated dienes described above. One embodiment of the invention is a polystyrene matrix including an elastomer having reduced styrene monomer content. Articles of manufacture prepared using polymers having reduced residual monomer content prepared by the method of the invention are also within the scope of the invention.

The following examples are set forth to illustrate the invention and should not be construed as being limitative thereof. Those skilled in the art will understand that alterations and modifications, including but not limited to selection of polymers, conjugated dienes, reaction conditions, preparation methods, amounts, and the like, which may be generally but not explicitly described or defined herein, may be made without departing from the scope of the invention.

EXAMPLES

Example 1

An amount of potassium sorbate, a crystalline solid, is dry-blended at 1 percent wt/wt with a polystyrene homopolymer matrix containing residual styrene monomer at a concentration of from 500 to 750 PPM of styrene monomer. The blend is then extruded in a twin-screw extruder at 420° F. (215.5° C.). Residence time is estimated to be about 1.5 to 2 minutes. As a comparison, a sample of the same polystyrene homopolymer matrix, which has not been blended with anything, is also melted under identical conditions in the twin-screw extruder to obtain a baseline residual monomer content. The resulting melted samples are than subjected to gas chromatographic analysis. The analysis shows that the presence of the potassium sorbate reduces the level of residual monomer by a significant percentage, as compared with the level present in the untreated polymer matrix.

Example 2

Amounts of potassium sorbate, alloocimene, and alpha-terpinene are used, under conditions identical to those employed in Example 1 but in an amount, for each, of 0.2 percent wt/wt, based on the polystyrene matrix, to prepare polymer compositions for use in determining rate constants. It is found that the potassium sorbate is not miscible with the polystyrene, but the alloocimene and the alpha-terpinene are both miscible. The purpose of this is to determine the order of reactivity, from greatest to least, for the three identified conjugated dienes. The calculation involves plotting ln[Sty][Sty]$_o$ versus time at a constant diene concentration for each diene. The slope of each curve is the k[Diene], i.e., the rate constant for that diene. The result shows that potassium sorbate has a k value of 0.460; alloocimene has a k value of 0.366; and alpha-terpinene has a k value of 0.272. These results are interpreted as showing that potassium sorbate is, of the three conjugated dienes tested, the most efficient at reducing residual styrene monomer, while alpha-terpinene is the least efficient.

Example 3

Samples are prepared according to Example 2 but are processed by extrusion and devolatilization using strand devolatilizers, a method enabling a residence time of about 4 minutes. The increase residence time results in a further decrease in the level of residual monomer, as determined by GC analysis.

What is claimed is:

1. A method for reducing residual monomer in a polymer matrix comprising:
preparing or obtaining a thermoplastic polymer matrix comprised of a homopolymer, a copolymer, or mixture thereof, and an amount of unreacted residual monomer;
admixing said polymer matrix and a conjugated diene under reaction conditions sufficient to reduce the amount of residual monomer, wherein the monomer comprises at least one electron withdrawing substituent; and
wherein said polymer matrix and said conjugated diene are admixed during devolatilization of the polymer or blended with the polymer matrix after devolatilization.

2. The method of claim 1 wherein the thermoplastic polymer matrix is comprised of a polystyrene homopolymer, a polystyrene copolymer, and mixtures thereof.

3. The method of claim 1 wherein the residual monomer in the polymer matrix is present in an amount of from about 1 percent by weight of the polymer to about 10 percent by weight of the polymer prior to admixing of the polymer matrix with the conjugated diene.

4. The method of claim 3 wherein the residual monomer is present in an amount of less than about 5 percent by weight of the polymer.

5. The method of claim 1 wherein the monomer is mono-substituted or 1,2 di-substituted.

6. The method of claim 5 wherein the electron withdrawing substituent is selected from the group consisting of aromatic groups, —CN, —COOH, —COOR$^6$, —COR$^6$, —F, —Cl, —Br, and combinations thereof, wherein R$^6$ is selected from the group consisting of alkyl and phenyl groups.

7. The method of claim 1 wherein the electron donating substituents are located at the 1 and 4 positions of the conjugated diene.

8. The method of claim 1 wherein the electron donating group is selected from the group consisting of —O$^-$, —COO$^-$, —NH$_2$, —NHCOCH$_3$, —SH, alkoxy, and —CH═CH—.

9. The method of claim 8 wherein the conjugated diene is potassium sorbate or a sorbic acid salt.

10. The method of claim 1 wherein the residual monomer is reduced by at least about 50 percent by weight of the polymer matrix.

11. The method of claim 1 wherein the residual monomer and conjugated diene form an adduct.

12. The method of claim 1 wherein the reaction conditions include a time of from about 0.5 minute to about 4 minutes.

13. The method of claim 1 wherein the conjugated diene is admixed with the polymer matrix after devolatilization and prior to or during melting to form a final end use article.

14. The method of claim 1 wherein the residual monomer and conjugated diene are contacted after devolatilization and during compounding of the polymer matrix.

15. The method of claim 1 wherein the residual monomer is reduced by an amount of at least about 50 percent by weight of the polymer matrix.

16. The method of claim 1 wherein the monomer to be reduced is non-polar and the conjugated diene is polar.

17. The method of claim 1 wherein there is more than one residual monomer and at least one residual monomer is polar and at least one residual monomer is non-polar.

18. The method of claim 17 additionally comprising using a second conjugated diene.

19. The method of claim 18 wherein one conjugated diene is polar and one conjugated diene is non-polar.

20. A thermoplastic polymer matrix comprised of a homopolymer, a copolymer, or mixture thereof, and an amount of unreacted residual monomer, wherein the monomer comprises at least one electron withdrawing substituent, and wherein said polymer matrix is admixed with conjugated diene comprised of at least one strong or moderate electron donating substituent, at least two weak electron donating substituents, or an adduct of a conjugated diene.

21. The polymer matrix of claim 20 wherein the continuous phase of the polymer matrix is polystyrene.

22. The polymer matrix of claim 21 additionally comprising an elastomer.

23. An article of manufacture comprising a polymer matrix of claim 20.

24. The method of claim 1, wherein the conjugated diene is selected from at least one strong or moderate electron donating substituent, at least two weak electron donating substituents, and an adduct of a conjugated diene.

25. The method of claim 1 the polymer matrix is additionally comprised of an elastomer.

26. The method of claim 1 wherein the conjugated diene is admixed with the polymer matrix after devolatilization and prior to or after pellet formation.

27. The method of claim 1 wherein the conjugated diene is selected from the group consisting of alloocimene; alpha-terpinene; 2,3-dimethyl-1,3-butadiene-; amino-piperylene; diphenyl-1,3-butadiene; 1-cyano-1,3-butadiene; and combinations thereof.

28. The method of claim 2 wherein the styrenic polymer is used for packaging applications that require water vapor barrier properties.

29. The method of claim 1 wherein the comonomers are selected from the group of:
(a) monovinylidene aromatic hydrocarbon monomers other than styrene of the formula:

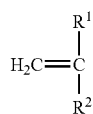

wherein $R^1$ is hydrogen, chlorine, or methyl, and $R^2$ is an aryl group of 6 to 10 carbon atoms, or wherein a substituent comprised of a halogen or an alkyl group is attached to an aromatic nucleus, and combinations thereof;
(b) alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichlorostyrene, vinyl naphthalene, and combinations thereof;
(c) lower alpha olefins of from 2 to 8 carbon atoms, and combinations thereof;
(d) ethylene, propylene, isobutylene, butene-1, pentene-1, and halogen and aliphatic substituted derivatives thereof, and combinations thereof;
(e) acrylic acid, methacrylic acid, and any corresponding acrylate and methacrylate alkyl esters wherein the alkyl group contains from 1 to 4 carbon atoms, and combinations thereof;
(f) methyl acrylate, ethylacrylate, propyl acrylate, methyl methacrylate, and combinations thereof;
(g) vinyl esters of the formula:

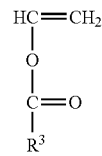

wherein $R^3$ is hydrogen, an alkyl group of from 1 to 10 carbon atoms, an aryl group of 6 to 10 carbon atoms, and combinations thereof;
(h) vinyl ether monomers of the formula:

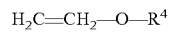

wherein $R^4$ is an alkyl group of from 1 to 8 carbon atoms, an aryl group of from 6 to 10 carbon atoms, or a monovalent aliphatic radical of from 2 to 10 carbon atoms, which aliphatic radical may be hydrocarbon- or oxygen-containing, and combinations thereof;
(i) monomeric vinyl ethers selected from vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, vinyl p-chlorophenylene glycol ether, and combinations thereof; and
(j) olefinically unsaturated mononitriles having the formula:

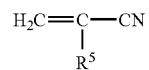

wherein $R^5$ is hydrogen, an alkyl group having 1 to 4 carbon atoms, or a halogen, and combinations thereof.

* * * * *